United States Patent [19]

Luber et al.

[11] Patent Number: 5,060,300

[45] Date of Patent: Oct. 22, 1991

[54] RECEIVER SWITCHABLE BETWEEN NETWORK SUPPLY MODE AND POWER-CONSERVING BATTERY SUPPLY MODE

[75] Inventors: Gunter Luber; Wolfgang Heuer, both of Hildesheim; Rudolf Messerschmidt, Sibbesse; Uwe Mätzold, Salzgitter, all of Fed. Rep. of Germany

[73] Assignee: Blaupunkt Werke GmbH, Hildesheim, Fed. Rep. of Germany

[21] Appl. No.: 622,385

[22] Filed: Nov. 30, 1990

Related U.S. Application Data

[63] Continuation of Ser. No. 307,349, Feb. 7, 1989, abandoned.

[30] Foreign Application Priority Data

Feb. 19, 1988 [DE] Fed. Rep. of Germany ....... 3805191

[51] Int. Cl.[5] ........................ H04B 17/00; H04B 1/16

[52] U.S. Cl. ...................................... 455/343; 455/67; 455/228

[58] Field of Search ................. 455/343, 127, 67, 341, 455/226, 227, 228, 117, 115

[56] References Cited

U.S. PATENT DOCUMENTS 4,499,603 2/1985 Eilers ................................. 455/205

FOREIGN PATENT DOCUMENTS 62-72234 4/1987 Japan ................................. 455/343

62-82727 4/1987 Japan ................................. 455/343

1525326 9/1978 United Kingdom ............... 455/343

OTHER PUBLICATIONS

Blaupunkt Public Information & Notification System; Mar. 1987.

*Primary Examiner*—Douglas W. Olms

*Assistant Examiner*—Ralph Smith

*Attorney, Agent, or Firm*—Frishauf, Holtz, Goodman & Woodward

[57] ABSTRACT

A radio warning receiver has a battery or accumulator (7) and means (8) for switching over to battery operation mode when network power (6) fails. Battery power is conserved by turning off (9) power to the end stage (3), placing the warning receiver in a so-called Stand-By Mode, until a control signal is detected (5) which indicates that a warning is to be broadcast. Then, power to the end stage is restored (11) for the duration of the warning broadcast.

2 Claims, 1 Drawing Sheet

RECEIVER SWITCHABLE BETWEEN NETWORK SUPPLY MODE AND POWER-CONSERVING BATTERY SUPPLY MODE

This application is a continuation of application Ser. No. 07/307,349, filed Feb. 7, 1989, now abandoned.

Cross-reference to related application, assigned to the assignee of the present invention, the disclosure of which is hereby incorporated by reference:

Receiver System for Coordinating Alarm Broadcasts, LUBER et al., Ser. No. 07/307,353, filed Feb. 7, 1989, Cross-reference to related patents, assigned to the assignee of the present invention, the disclosures of which are hereby incorporated by reference:

U.S. Pat. No. 4,334,320, LIMAN; U.S. Pat. No. 4,476,581, BRAGAS; U.S. Pat. No. 4,499,603, EILERS; U.S. Pat. No. 4,543,532, KASSAR; U.S. Pat. No. 4,584,708, BRAGAS & EILERS; U.S. Pat. No. 4,679,238, MARKOVIC; U.S. Pat. No. 4,719,623, LEYSER: U.S. Pat. No. 4,736,392, KAMMEYER; German patent DE-PS 32 11 813 corresponding to U.S. Pat. No. 4,499,603.

The present invention relates generally to radio receivers and, more particularly, to an emergency broadcast receiver in which power is conserved by shutting down the end stage when the main power supply fails.

BACKGROUND

Radio systems which permit pre-emption of regular programming for special announcements or warnings, e.g. about traffic accidents or traffic congestion in the vicinity of a particular transmitter broadcasting a particular auxiliary carrier signal, are well known, and are described in, among others, the above-noted U.S. patents of Blaupunkt Werke GmbH.

THE INVENTION

Blaupunkt Werke GmbH has issued a brochure on its PINS (Personal Information & Notification System) devices. The brochure describes, among other things, radio receivers for warning and emergency broadcasts. These receivers are powered using self-controlled monitoring circuits, as described in German patent DE-PS 32 11 813.

In the event of power failure, conventional receivers are powered by a built-in battery. Such supply from an accumulator requires minimal power consumption in the receiver, in order to maximize battery lifetime.

Power consumption in such a receiver can be significantly reduced if the emergency receiver is constructed with means for shutting off the end stage, e.g. containing the amplifiers which drive the speaker in the event of failure of network power, except when an emergency message is being received.

DRAWING

The single FIGURE is a block diagram of the power-conserving radio receiver of the present invention.

DETAILED DESCRIPTION

Figure 1:
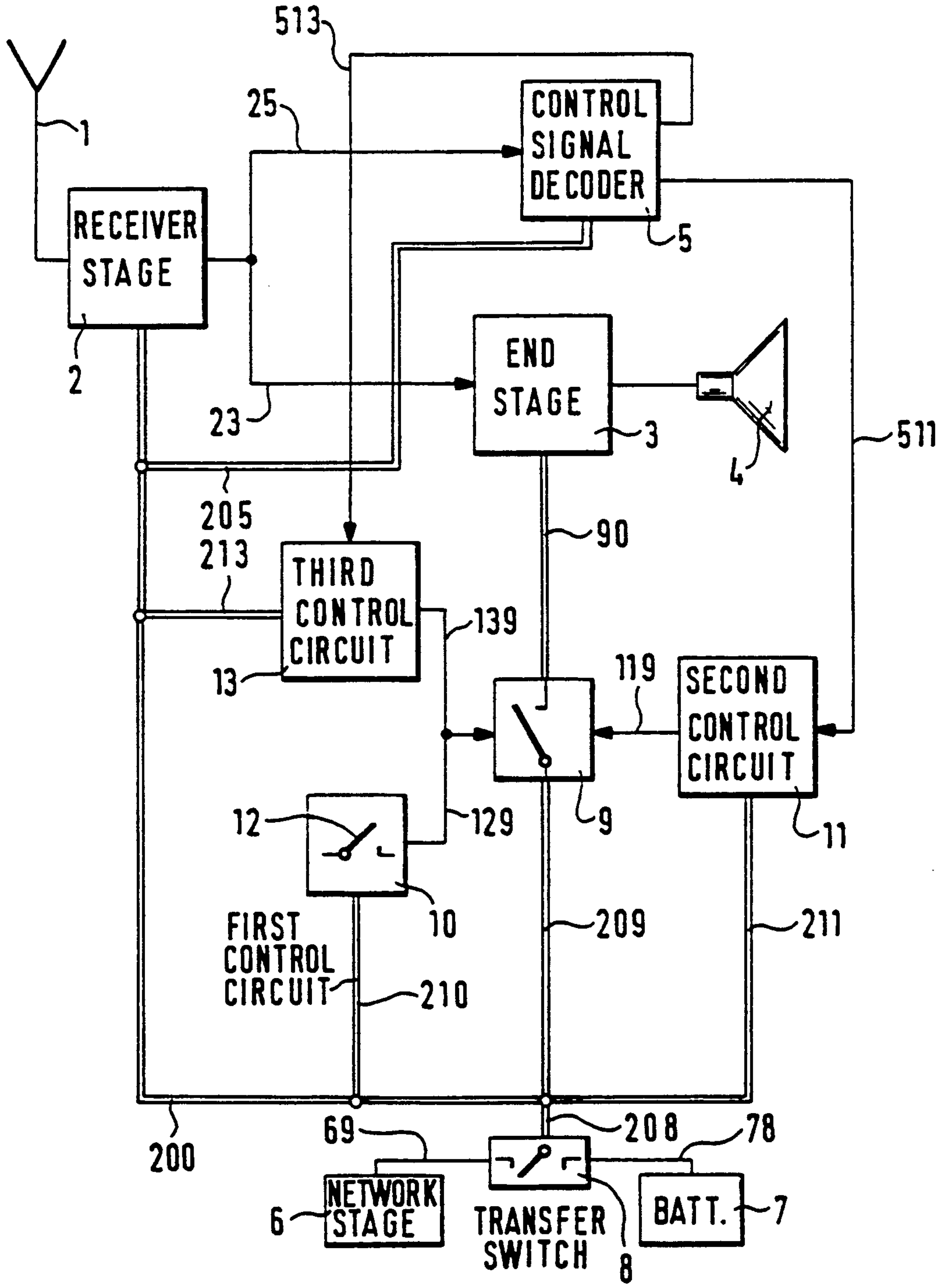

Connected to antenna 1 is a receiver stage 2, whose output is connected to an end stage 3, which in turn drives a speaker 4. Parallel to end stage 3, a control signal decoder 5 is connected to the output of receiver stage 2.

For their operation, the aforementioned stages require a power supply, which in the case of emergency receivers includes a network connection stage 6 and a battery or accumulator 7. A switch 8 connects alternately one of these power sources.

It is known to modulate control signals for a receiver on an auxiliary carrier, e.g. at 57 KiloHertz (KHz), and to transmit these, together with the program signals on the main carrier frequency associated with the transmitter, to the receivers.

A special kind of such control signals is transmitted by radio data signal (RDS) as described in a specification of the European Broadcasting Union (EBU). Its information capacity has not yet been absorbed by the applications for which portions have thus far been reserved. Thus, the decoder of the present invention can be an RDS decoder, but is not limited to RDS.

The power supply circuit of the end stage contains a controllable ON/OFF switch or relay 9, which can cut off end stage 3 from power sources 6, 7. The power supply leads are drawn bolder (double lines) in the block diagram because they form a separate circuit from the signal leads.

ON/OFF switch 9 can be toggled by either of two separate control circuits 10 and 11. First control circuit 10 includes an auxiliary terminal 12 of transfer switch 8, which assures supply of power to the receiver from the battery upon failure of network power. In the position which auxiliary terminal 12 assumes when network power fails, auxiliary terminal 12 carries out an opening of ON/OFF switch 9, which cuts off end stage 3 from receiver stage 2 and control signal decoder 5, which both continue to draw power.

Second control circuit 11 is connected to, among other things, an output of control signal decoder 5. Upon reception of a predetermined control signal, second control circuit 11 causes switch 9 to close again.

If the predetermined control signal for closure of switch 9 cannot be repeated often enough in the radio data signal to keep switch 9 closed, then second control circuit 11 must include a holding circuit, and a third control circuit 13 must control the re-opening of switch 9. This third control circuit operates analogously or parallel to the first control circuit.

The control circuits can best be carried out using semiconductor switches. Their structure is substantially determined by the foregoing details, so that more precise description would be superfluous.

This circuit accomplishes, in addition to switching of the power supply lines to the built-in battery, a separation of the end stage from the power supply circuit. The warning receiver thus enters a so-called Stand-By Mode.

If the warning transmitter sends a warning message and precedes it with a control signal, e.g. as an RDS modulation of the 57 KHz auxiliary carrier, the control signal decoder 5, upon receipt of this signal, carries out a re-connection of the end stage by means of ON/OFF switch 9, so that the warning message is heard over the speaker 4.

If the warning message has ended, switch 9 opens again, assuming that it is no longer held by control circuit 10 nor driven to open by first control circuit 12. In the latter case, the warning transmitter must generate an end-indication signal at the conclusion of the warning message.

Various changes and modifications are possible within the scope of the inventive concept.

We claim:

1. Warming receiver having a receiver stage (2) with at least one signal output (23,25,200), an end stage (3) for driving speaker means (4), and a power supply stage (6,7,8,9,90) including an ON/OFF switch (9) with a power supply input (209) and a plurality of control inputs (119, 129, 139) controlling supply of power (90) to said end stage (3) in accordance with signals received over said control inputs, and further including, as alternative power sources, a network connection stage (6) and a battery (7), and means (8), coupled to said power supply input (209) of said ON/OFF switch (9), for transfer between said alternative power sources, a control signal decoder (5) connected (25) to an output of said receiver stage (2), a first control circuit (10) detecting any failure of network power and in response thereto directing changeover by said transfer means (8) to battery operation mode and signalling (129) said ON/OFF switch (9) to interrupt supply of power to said end stage (3), thereby conserving power yet preventing unnecessary switchoffs, due to momentary fading or loss of signal from said receiver stage (2), by said ON/OFF switch (9) of power to said end stage (4), a second control circuit (11) having an input (511) connected to an output of said control signal decoder (5) and operative, in response to a predetermined signal from said decoder, to transmit a signal to said ON/OFF switch (9) over a control input (119) of said switch to reverse the interruption of power to said end stage (3), upon receipt of a first control signal in said receiver stage (2) and detection thereof in said decoder (5), to restore power during a warning broadcast, signal leads (200, 205, 210, 211) interconnecting an output of said receiver stage (2) and respective signal terminals of at least said control signal decoder (5), said transfer means (8), and said first and second control circuits (10, 11), and power supply leads (208, 209) from said transfer means (8) to at least said receiver stage (2), said first and second control circuits (10, 11), and said ON/-OFF switch (9).

2. Warning receiver according to claim 1, further comprising a third control circuit (13) connected between said receiver stage (2) and said ON/OFF switch (9) in parallel to said first control circuit (10) and operative on said ON/OFF switch (9) via one (139) of said control inputs of said switch to interrupt supply (90) of power to said end stage upon receipt of a second control signal, denoting end of a warning broadcast, by said receiver stage (2) and detection thereof by said control signal decoder (5).

* * * * *